No. 692,628. Patented Feb. 4, 1902.
F. CLOUTH.
RESILIENT TIRE FOR VEHICLES.
(Application filed Dec. 7, 1901.)
(No Model.)
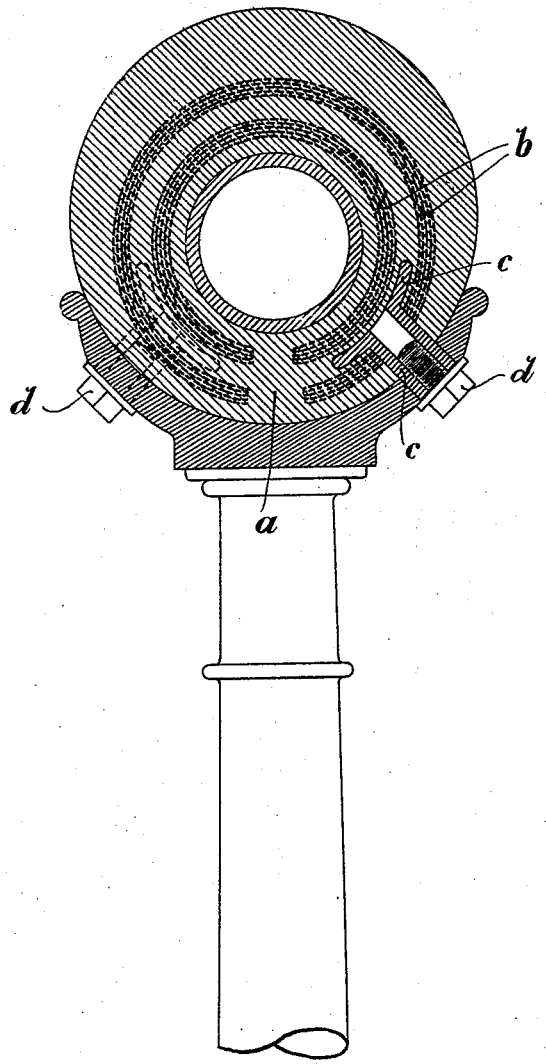
Witnesses:
Dennis Sumby.
C. D. Kesler.
Inventor
Franz Clouth
By James L. Norris.
Atty

United States Patent Office.

FRANZ CLOUTH, OF COLOGNE-NIPPES, GERMANY.

RESILIENT TIRE FOR VEHICLES.

SPECIFICATION forming part of Letters Patent No. 692,628, dated February 4, 1902.

Application filed December 7, 1901. Serial No. 85,076. (No model.)

*To all whom it may concern:*

Be it known that I, FRANZ CLOUTH, manufacturer, a subject of the King of Prussia, Emperor of Germany, residing at 100 Nichlerstrasse, Cologne-Nippes, Rhine Province, Prussia, Germany, have invented certain new and useful Improvements in Resilient Tires for Vehicles, of which the following is a specification.

Hollow rubber tires to be filled with compressed air for the wheels of motor and like vehicles have hitherto been provided with annular insertions of canvas or the like for the purpose of increasing their strength and durability. These tires are held in the rim either by means of a row of screws arranged in the center of the bottom of the rim or by means of two rows of screws formed on both sides of the center of the rim. It has been found that such a tire very soon becomes porous or permeable to air on its smallest circumference, which is in contact with the bed of the rim and in which it undergoes the greatest pressure. This arises from the fact that at the place in question a vigorous movement of the wall of the tire under strong pressure takes place, whereby the connection between the layers of the canvas insertion and the rubber is somewhat loosened and pores are formed, which afford an opportunity for the gradual escape of the air.

The present invention is intended to remove this drawback by the interruption of the canvas or the like layers $b$ at this unsatisfactory part, as shown in the section of the tire in the accompanying drawing—that is to say, between the middle of the inner circumference of the tire and the place of contact with the middle of the bed of the rim ($a$ in the drawing)—and only employing pure rubber at that place. By reason of its unimpaired elasticity this rubber allows the wall of the tire to yield and to expand on all sides without causing separations or defects in the connection of the inner canvas or the like layers, and thereby the stated defect is removed. As the canvas insertion must be present at those places at which the tire is attached to the bed of the rim by means of screws or the like, in order to obtain the necessary strength, the use of a tire of the kind depicted necessitates a method of fastening in which the center $a$ is penetrated by no means of attachment passing through it. Thus, for instance, the method of attachment shown in the drawing by means of two screws and screw-sockets $c$ $d$ may be employed with particular advantage, the soft and elastic part $a$ of the tire then having to receive no attaching parts.

Of course the arrangement shown may be also employed with advantage in the case of solid tires, as by this means the destruction of the internal connection of the wall of the tire $a$ is avoided, even although the benefit is doubly valuable in the case of pneumatic tires, owing to its action in preventing the air from escaping.

I declare that what I claim is—

1. In a tire for the wheels of vehicles, the combination of a resilient body material, with insertions of non-extensible strengthening material of complete circular section except for a breadth on the inner circumference of the tire in proximity to the bed of the rim at which part the resilient material is uninterrupted, substantially as and for the object set forth.

2. In a tire for the wheels of vehicles, the combination of a resilient body material, insertions of non-extensible strengthening material complete in the outer portion of the tire but terminating in each side near the center of the bed of the rim, and means of attachment adapted to engage said tire in the part containing the canvas insertion, substantially as and for the object set forth.

In testimony whereof I have hereunto set my hand in presence of two subscribing witnesses.

FRANZ CLOUTH.

Witnesses:
 CHARLES L. SEMPLE,
 CARL SCHMITT.